US011545806B2

(12) United States Patent
Peterson et al.

(10) Patent No.: US 11,545,806 B2
(45) Date of Patent: Jan. 3, 2023

(54) CONDUCTOR ASSEMBLY STAGING FOR ROBOTIC INSTALLATION

(71) Applicant: APTIV TECHNOLOGIES LIMITED, St. Michael (BB)

(72) Inventors: David R. Peterson, Aurora, OH (US); Joseph Sudik, Jr., Miles, OH (US); Duane Lee Brantingham, Cortland, OH (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 199 days.

(21) Appl. No.: 17/120,402

(22) Filed: Dec. 14, 2020

(65) Prior Publication Data

US 2021/0210920 A1 Jul. 8, 2021

Related U.S. Application Data

(60) Provisional application No. 62/956,872, filed on Jan. 3, 2020.

(51) Int. Cl.
*H01R 43/26* (2006.01)

(52) U.S. Cl.
CPC ......... *H01R 43/26* (2013.01); *H01R 2201/26* (2013.01)

(58) Field of Classification Search
CPC .......................... H01R 43/26; H01R 2201/26
See application file for complete search history.

(56) References Cited

U.S. PATENT DOCUMENTS

| 9,630,315 B2 * | 4/2017 | Cookson | G05B 19/128 |
| 10,076,844 B2 * | 9/2018 | Rizk | B25J 15/0491 |
| 10,205,266 B1 | 2/2019 | Peterson et al. | |
| 10,355,409 B2 | 7/2019 | Peterson et al. | |
| 10,780,575 B2 * | 9/2020 | Reese | B25J 19/0029 |
| 2010/0267270 A1 * | 10/2010 | Jehmlich | H01R 13/6599 439/607.41 |
| 2011/0234788 A1 | 9/2011 | Koike et al. | |
| 2015/0032252 A1 * | 1/2015 | Galluzzo | B60P 1/5423 700/218 |

FOREIGN PATENT DOCUMENTS

EP 3422487 A1 1/2019

OTHER PUBLICATIONS

European Search Report dated May 11, 2021. 8 pages.

* cited by examiner

*Primary Examiner* — Carl J Arbes
(74) *Attorney, Agent, or Firm* — RMCK Law Group, PLC

(57) ABSTRACT

A staging system for robotic installation of a conductor assembly comprises a base member defining a base identifier that is identifiable by a robotic installer, a set of receptacles attached to the base member and defining respective receptacle identifiers, wherein each receptacle is configured to receive and temporarily secure one or more of a set of connectors of the conductor assembly, which also comprises respective sets of wire cables for the set of connectors, and a set of robotic installation features at least temporarily attached to or defined by the set of connectors, respectively, and defining respective installation identifiers, wherein each robotic installation feature is configured to be temporarily interacted with by an end effector of the robotic installer such that the robotic installer obtains movable control of the connector to remove it from its respective receptacle and to install it with a corresponding electrical connector.

20 Claims, 4 Drawing Sheets

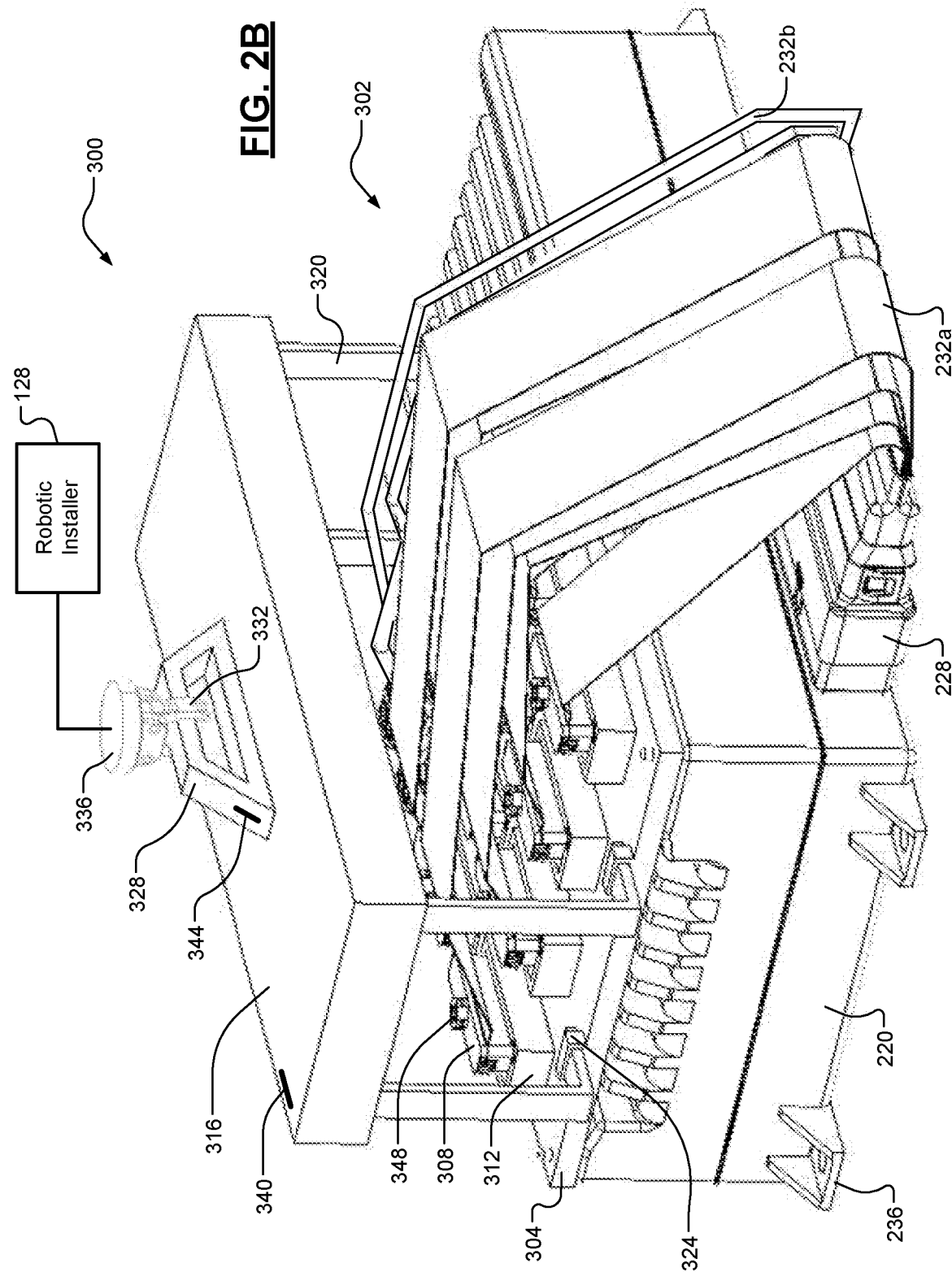

CONDUCTOR ASSEMBLY STAGING FOR ROBOTIC INSTALLATION

CROSS-REFERENCE TO RELATED APPLICATION(S)

The present application claims the benefit of U.S. Provisional Application No. 62/956,872, filed on Jan. 3, 2020. The disclosure of this application is incorporated herein by reference in its entirety.

FIELD

The present disclosure generally relates to automotive electrical systems and, more particularly, to staging conductor assemblies for robotic installation.

BACKGROUND

A conductor assembly typically comprises a plurality of wire cables electrically connected to respective plurality of connectors. During installation, each wire cable/connector is intended to connect to other corresponding electrical connectors/systems. Manual installation of wire cables/connectors by a human installer can be time consuming and costly, particularly for less experienced human installers and for more complex installation projects (e.g., conductor assemblies having a large number of wire cables/connectors). Automated installation by a robotic installer may be preferable to manual human installation due to increased speed and decreased costs. The robotic installer, however, must be able to accurately identify each wire cable/connector and obtain movable control of then in order to complete the robotic installation. In some cases, multiple cable/connector pairs may need to be moved and installed simultaneously, which further increases the complexity. Complex visual scanning or viewing systems could be utilized by the robotic installer, but this could further increase costs and complexity. Accordingly, while conventional conductor assemblies and conventional robotic installers work well for their intended purpose, an opportunity exists for improvement in the art of robotic installation of conductor assemblies.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, a staging system for robotic installation of a conductor assembly that includes a set of wire cables connected to a respective set of connectors is presented. In one exemplary implementation, the staging system comprises: a base member defining a base identifier that is identifiable by a robotic installer, a set of receptacles attached to the base member and defining respective receptacle identifiers that are identifiable by the robotic installer, wherein each receptacle is configured to receive and temporarily secure one or more of the set of connectors of the conductor assembly, and a set of robotic installation features at least temporally attached to or defined by the set of connectors, respectively, and defining respective installation identifiers that are identifiable by the robotic installer, wherein each robotic installation feature is configured to be temporarily interacted with by an end effector of the robotic installer such that the robotic installer obtains movable control of the connector to remove it from its respective receptacle and to install it with a corresponding electrical connector.

In some implementations, the base identifier is a scannable identifier defined on a surface of the base member. In some implementations, the set of receptacle identifiers are predefined positions with respect to the base member that are known by the robotic installer without scanning. In some implementations, the set of receptacle identifiers are scannable identifiers defined on surfaces of the respective receptacles or on the surface of the base member proximate to the respective receptacles. In some implementations, the installation identifiers are scannable identifiers defined on surfaces of the respective connectors, surfaces of the set of wire cables corresponding to the respective connectors, or surfaces of the robotic installation features corresponding to the respective connectors. In some implementations, corresponding pairs of receptacle identifiers and installation identifiers collectively form a single complimentary scannable identifier.

In some implementations, the staging system further comprises one or more preliminary robotic installation features at least temporarily attached to or defined by the base member, wherein the one or more preliminary robotic installation features are configured to be interacted with by the end effector or another end effector of the robotic installer to position the base member, the set of receptacles, the conductor assembly, and the set of robotic installation features in an installation position for a vehicle. In some implementations, the base member is at least temporarily attached to an outer surface of a controller of the vehicle. In some implementations, the one or more preliminary robotic installation features are removable from the base member upon the controller, the base member, the set of receptacles, the conductor assembly, and the set of robotic installation features being positioned in the installation position for the vehicle. In some implementations, opposing ends of the set of wire cables of the conductor assembly are preconnected to the controller, and wherein the set of connectors of the conductor assembly are configured to be installed with corresponding electrical connectors associated with sensor systems of the vehicle.

According to another aspect of the present disclosure, a method of robotic installation of a conductor assembly including a set of wire cables and a respective set of connectors is presented. In one exemplary implementation, the method comprises: identifying, by a robotic installer, a base identifier defined by a base member of a staging system, wherein the staging system further comprises a set of receptacles attached to the base member and wherein each receptacle is configured to receive and temporarily secure one or more of the set of connectors of the conductor assembly, identifying, by the robotic installer, a set of receptacle identifiers defined the set of receptacles in response to identifying the base identifier, identifying, by the robotic installer, a set of installation identifiers defined by a set of robotic installation features at least temporally attached to or defined by the set of connectors, respectively, in response to identifying the set of receptacle identifiers, and temporarily interacting with, by an end effector of the robotic installer, at least one of the set of robotic installation features to obtain movable control of a respective connector to remove it from its respective receptacle in response to identifying the set of installation identifiers and to then install it with a corresponding electrical connector.

In some implementations, the base identifier is a scannable identifier defined on a surface of the base member that is scanned by the robotic installer to identify the base identifier and the base member. In some implementations, the set of receptacle identifiers are predefined positions of the set of receptacles with respect to the base member that are known by the robotic installer without scanning. In some implementations, the set of receptacle identifiers are scannable identifiers defined on surfaces of the respective receptacles or on the surface of the base member proximate to the respective receptacles and are scanned by the robotic installer to identify the set of receptacle identifiers and the set of receptacles. In some implementations, the installation identifiers are scannable identifiers defined on surfaces of the respective connectors, surfaces of the set of wire cables corresponding to the respective connectors, or surfaces of the robotic installation features corresponding to the respective connectors, and are scanned by the robotic installer to identify the set of installation identifiers, the set of robotic installation features, and the set of connectors. In some implementations, corresponding pairs of receptacle identifiers and installation identifiers collectively form a single complimentary scannable identifier.

In some implementations, the staging system further comprises one or more preliminary robotic installation features at least temporarily attached to or defined by the base member, and the method further comprises: identifying, by the robotic installer, the one or more preliminary robotic installation features, and temporarily interacting with, by the end effector or another end effector of the robotic installer, the one or more preliminary robotic installation features in response to identifying the one or more preliminary robotic installation features to thereby position the staging system in an installation position for a vehicle. In some implementations, the base member of the staging system is at least temporarily attached to an outer surface of a controller of the vehicle. In some implementations, the one or more preliminary robotic installation features are removable from the base member upon the controller and the staging system being positioned in the installation position for the vehicle, and opposing ends of the set of wire cables of the conductor assembly are preconnected to the controller, and wherein the set of connectors of the conductor assembly are configured to be installed with corresponding electrical connectors associated with sensor systems of the vehicle.

According to yet another aspect of the present disclosure, a staging system for robotic installation of a conductor assembly that includes a set of wire cables connected to a respective set of connectors is presented. In one exemplary implementation, the staging system comprises a base member means defining a base identifier means that is identifiable by a robotic installer means, a set of receptacle means attached to the base member means and defining respective receptacle identifier means that are identifiable by the robotic installer means, wherein each receptacle means is configured to receive and temporarily secure one or more of the set of connectors of the conductor assembly, and a set of robotic installation feature means at least temporarily attached to or defined by the set of connectors, respectively, and defining respective installation identifier means that are identifiable by the robotic installer means, wherein each robotic installation feature means is configured to be temporarily interacted with by an end effector means of the robotic installer means such that the robotic installer means obtains movable control of the connector to remove it from its respective receptacle means and to install it with a corresponding electrical connector.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2A-2B illustrate views of a second example conductor assembly staging system according to some implementations of the present disclosure.

DETAILED DESCRIPTION

Figure 1:
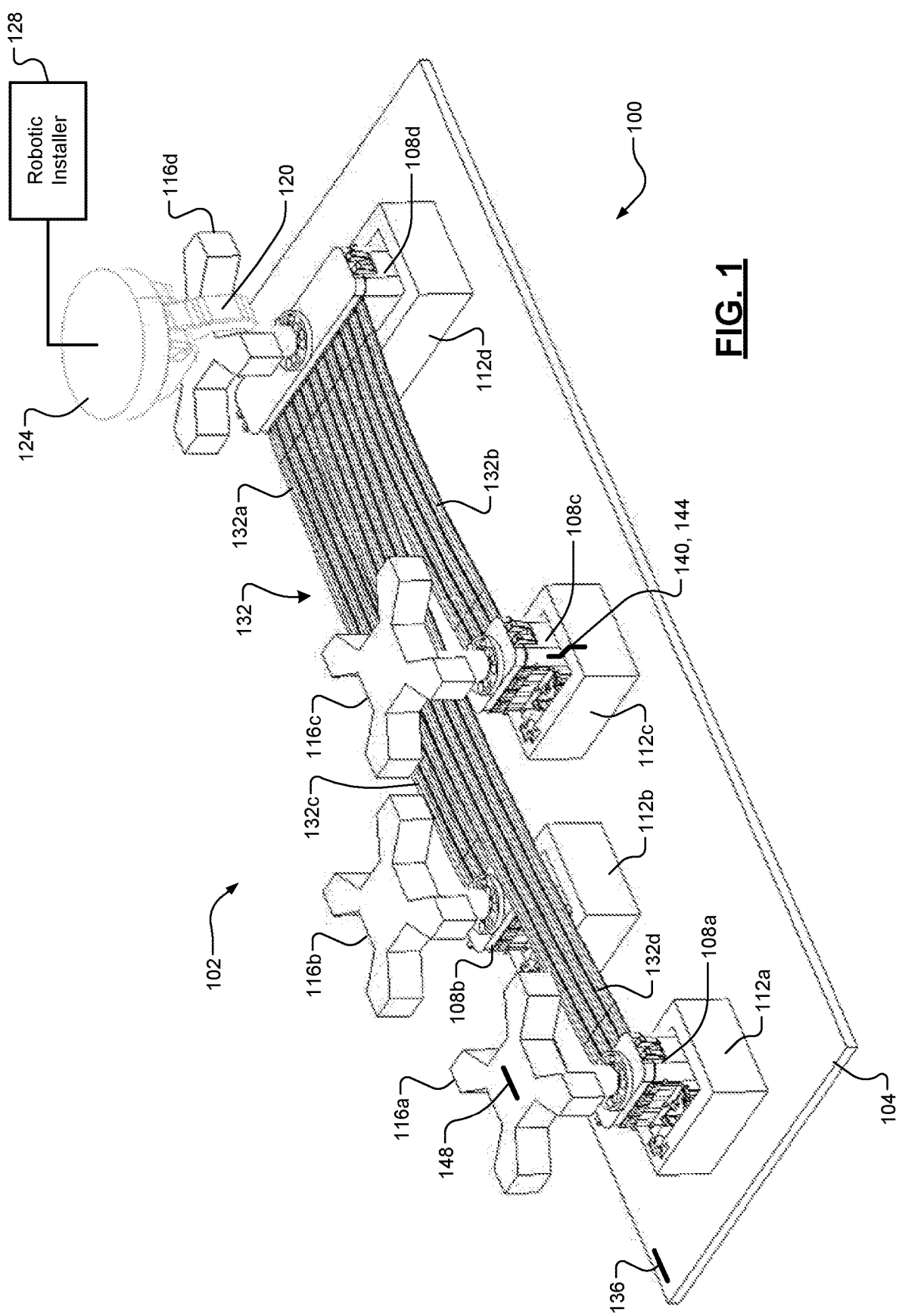
FIG. 1 illustrates a view of a first example conductor assembly staging system according to some implementations of the present disclosure.

Referring now to FIG. 1, a first example staging system 100 for a conductor assembly 102 is illustrated. The term "conductor assembly" as used herein refers to a set of wire cables electrically connector to a set of respective connectors. The staging system 100 comprises a base member 104 having a set of receptacles 112a, 112b, 112c, 112d (collectively, "receptacles 112") attached thereto. While four receptacles are shown, it will be appreciated that other quantities of receptacles could be implemented. In the illustrated example, receptacles 112a, 112b, 112c, 112d have received connectors 108a, 108b, 108c, and 108d (collectively "connectors 108") and fix them therein, respectively. While differently sized square or rectangular shaped connectors are illustrated, it will be appreciated that any suitable size, shape, or type of connector could be used by providing specifically designed or universal configurations for the receptacles 112. At least temporarily attached to or defined by the connectors 108 is a respective set of robotic installation features 116a, 116b, 116c, 116d (collectively, "robotic installation features 116"). In the illustrated example, these robotic installation features 116 are each a graspable, X-shaped member, but it will be appreciated that any suitable shaped or different type of robotic installation feature could be utilized. The robotic installation features 116 are temporarily interacted with by an end effector 124 (e.g., a grasping member) of the robotic installer 128. As shown, the end effector 124 has grasped robotic installation feature 116d, which gives the end effector 124 and the robotic installer 128 movable control of connector 108d via robotic installation feature 116d.

It will be appreciated that the robotic installer 128 could include a plurality of different end effectors, such as four end effectors (i.e., one per robotic installation feature 116a, 116b, 116c, 116d). This could be necessary, for example, for the simultaneous removal of all of the connectors 108 due to unique wire cable designs, such as the one illustrated. As shown, four portions 132a, 132b, 132c, 132d have different widths and/or lengths and are electrically connected to the connectors 108. More specifically, portion 132a is the widest and shortest portion and is electrically connected only to connector 108d. Portion 132a then branches out into the three other portions 132b, 132c, 132d (from shortest to longest in length), which are in turn electrically connected to connectors 108c, 108b, and 108a, respectively. By obtaining movable control of all of the robotic installation features 116 and the connectors 108 simultaneously, the conductor assembly 102 is in its entirety movably installable without potentially damaging the conductor assembly 102 (e.g., tearing a portion of the wire cable 132). Identification of the various components described above by the robotic installer 128 could be achieved in a variety of ways. As previously mentioned, complex high-precision viewing systems could be utilized, but these increase costs and/or complexity. In the illustrated example, the base member 104 defines a base identifier 136.

The term "identifier" as used herein refers to any marking that could be identified by the robotic installer 128, including, but not limited to, barcodes, quick-read (QR) codes, numerical, alphabetical, or alphanumerical strings, or symbols/shapes. For example only, the base identifier could be laser etched or engraved onto the surface of the base member 104 as shown. In some implementations, there could be one or more receptacle identifiers 144, 148 for each receptacle-connector pair. For example, in the illustrated example, receptacle 112c defines a first receptacle identifier 144 and connector 108c defines a second complimentary receptacle identifier 148. By scanning these complimentary receptacle identifiers 144, 148 as a single identifier, the robotic installer 128 could be able to verify that the connector 108c is properly fixed in the receptacle 112c. It will be appreciated that receptacle identifiers 144, 148 could also be separate and not otherwise connected or complimentary. In another implementation, the receptacle identifiers 144, 148 could be predefined or known locations of the receptacles 112 with respect to the base member 104 (i.e., not a physical identifier). In other words, after identifying the upper left corner of the base member 104 via base identifier 136, the robotic installer 128 would then know the x-y coordinate positioning of the receptacles 112. Installation identifiers could also be utilized, such as the installation identifier on the surface of robotic installation feature 116a. It will be appreciated, however, that the robotic installation features 116 could also be identified using other suitable methods, such as predefined or known locations as described above or by recognizing the shape (e.g., an X-shape) using a scanning system.

Figure 2A:
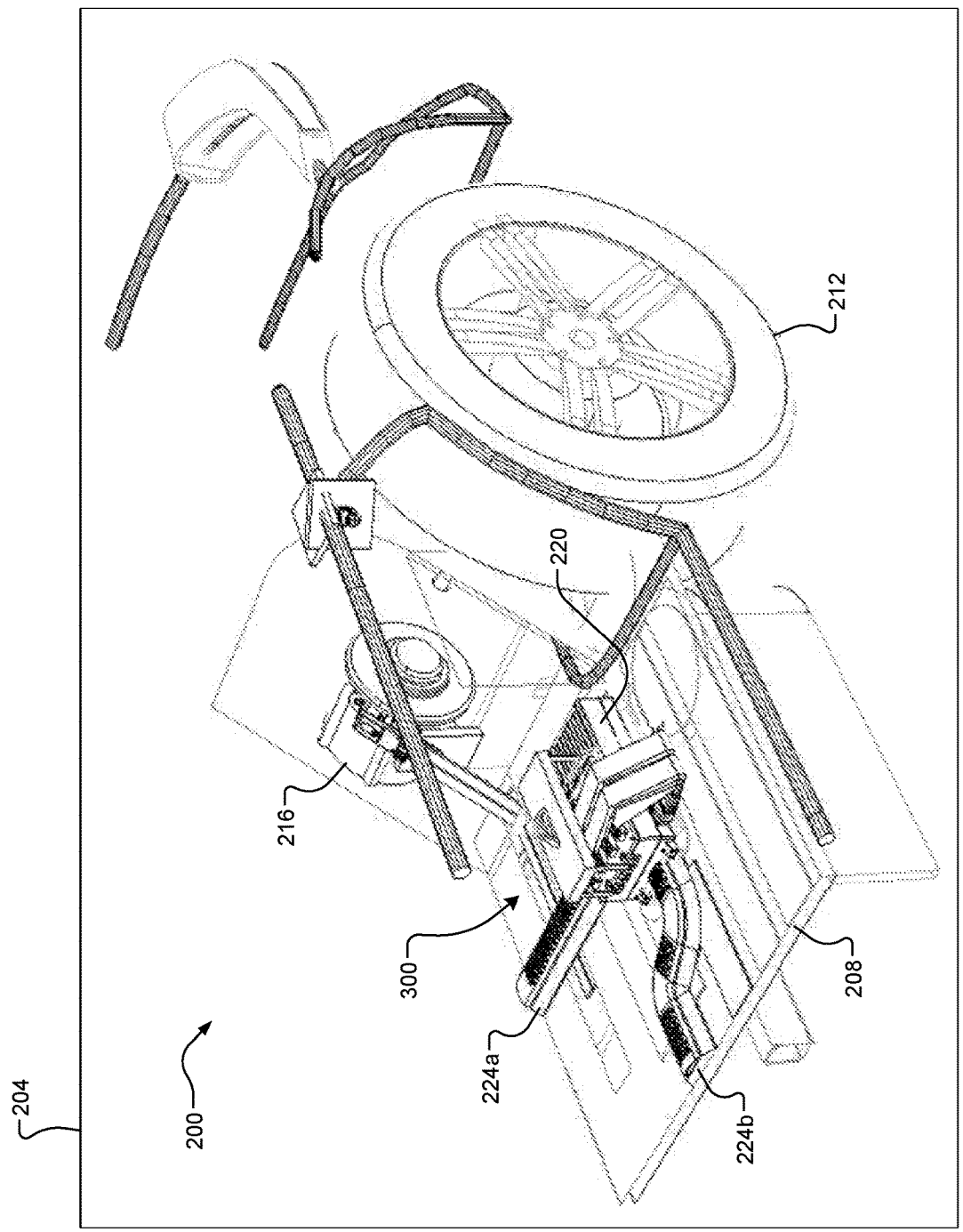

Referring now to FIGS. 2A-2B, a second example staging system 300 positioned in an installation position of a vehicle 200 is illustrated. FIG. 2A illustrates a rear-left (RL) quarter portion 204 of the vehicle 200 where the staging system 300 is used for installation. The vehicle 200 defines a base or bottom surface 208 where the staging system 300 is positioned. The vehicle 200 comprises, among other components that are not illustrated, a driveline 212 (wheels, tires, axles, etc.) that are driven by an electric motor 216 or another suitable drive system. A controller 220 controls operation of at least the RL quarter portion 204 of the vehicle 200. The controller 220 is electrically connected to and in communication with other modules (e.g., other vehicle controllers) via cables 224a, 224b. FIG. 2B shows a more detailed view of the staging system 300, which includes the controller 220. The controller 220 is preconnected via connector 228 to a plurality of flat or band wire cables 232a and a plurality of round coaxial cables 232b. While these specific wire cable types/configurations are illustrated, it will be appreciated that the controller 220 could have any suitable preconnected wire cables. The controller 220 is mountable in an installation position on the base or bottom surface 208 of the vehicle 200 via brackets 236. The staging system 300, including the controller 220 and the other above-described components, could be initially positioned in its installation position by the robotic installer 128 as described in greater detail below.

The staging system 300 further comprises a base member 304 that is at least temporarily attached to the top of the controller 220. Attached to the base member are a plurality of receptacles 312 having a plurality of respective connectors 308 received and fixed therein. As shown, some of the connectors 308 are connected to the flat or band wire cables 232a whereas other connectors 308 are connected to the round coaxial cables 232b. For example, these connectors 308 could be used to connect the controller 220 to respective electrical devices or systems (e.g., RADAR, LIDAR, electric traction motors, and the like). As shown, the staging system 300 further comprises preliminary robotic installation features 316, 320, 324, and 328 that are at least temporarily attached to or defined by the base member 304. More specifically, an upper member 316 covers (e.g., and protects from damage) the connectors 308 fixed in the receptacles 312. The upper member 316 is at least temporarily attached to the base member 304 via corner post members 320 and respective receptacle features 324 attached to or defined by the base member 304. Robotic installation feature 328 (e.g., a graspable handle) is configured to be interacted with by a grasping member 332 of end effector 336 of the robotic installer 128. For example, the upper member 316 and then the robotic installation feature 328 could be identified by the robotic installer using respective identifiers 340, 344. After obtaining movable control of the staging system 300 via end effector 336, the robotic installer 128 can position the staging system 300 (including the controller 220) in the installation position of the vehicle 200 (see FIG. 2A). The preliminary robotic installation features could then be removed and installation of the connectors 308 could continue, which could involve the use of the same or a different type of end effector to interact with robotic installation features 348 of the connectors 308 (keyhole slots, equal arm cross shaped slots, t-shaped slots, etc.).

Figure 3:
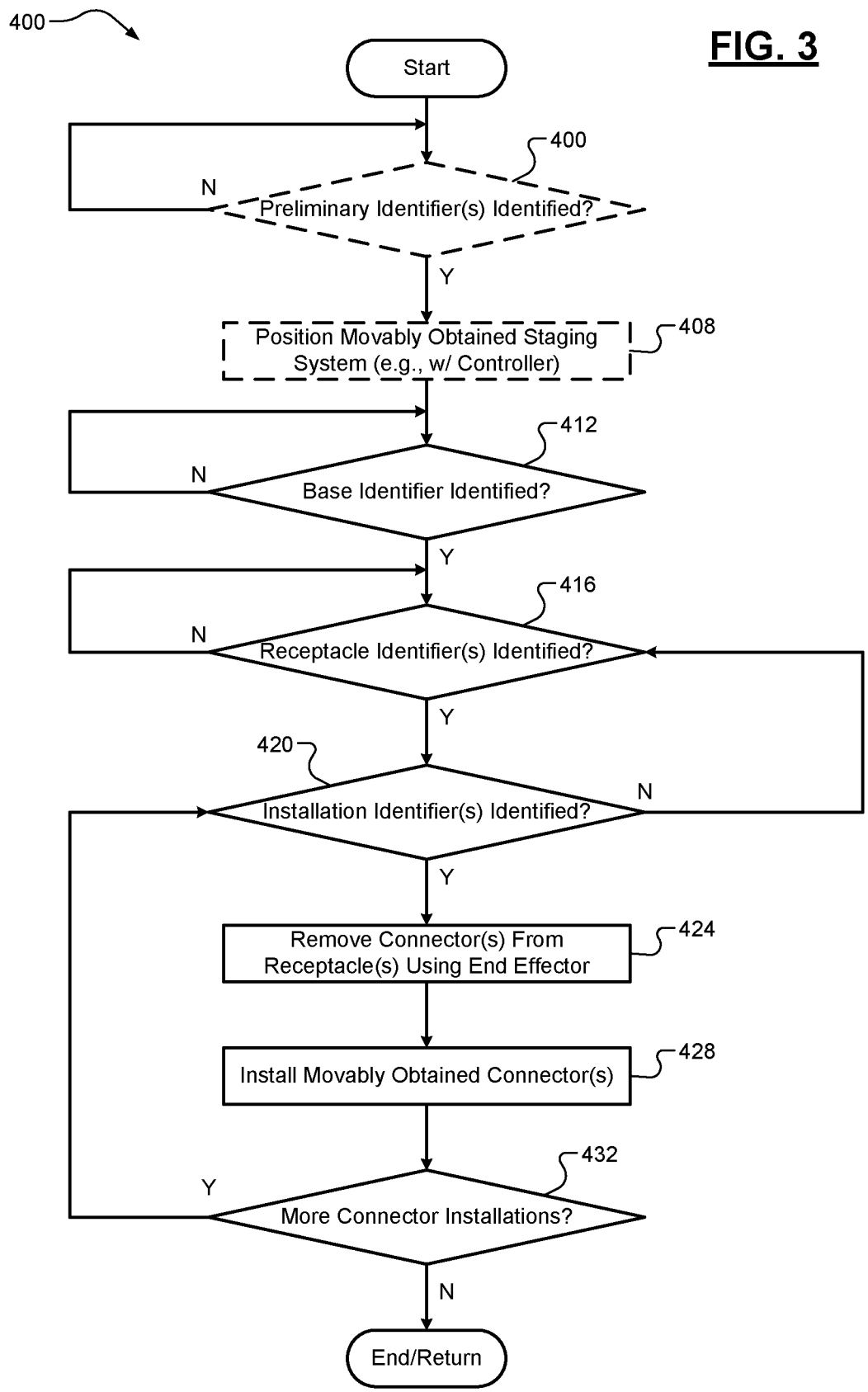
FIG. 3 illustrates a flow diagram of a method of robotic installation of a conductor assembly according to some implementations of the present disclosure.

FIG. 3 illustrates a flow diagram of a method 400 of robotic installation of a conductor assembly (a set of wire cables and a set of respective connectors) that are staged by a staging system. At optional 404, a robotic installer (e.g., robotic installer 128) determines whether preliminary identifier(s) of the staging system have been identified. When true, the method 400 proceeds to optional 408. Otherwise, the method 400 ends or returns. At optional 408, the robotic installer obtains movable control of the staging system (e.g., staging system 300 with controller 220) and positions the staging system in an installation position (e.g., of vehicle 200). At 412, the robotic installer determines whether a base identifier for a base member of the staging system has been detected. When true, the method 400 proceeds to 416. Otherwise, the method 400 returns to 412 or ends. At 416, the robotic installer determines whether receptacle identifier(s) of the staging system have been identified. When true, the method 400 proceeds to 420. Otherwise, the method 400 ends or returns to 416. At 420, the robotic installer determines whether installation features of the staging system have been identified. When true, the method 400 proceeds to 424. Otherwise, the method 400 ends or returns to 420. At 424, the robotic installer obtains movable control of at least some of the connectors via end effector(s) and removes the connector(s) from their respective receptacles. At 428, the robotic installer, via the end effector(s), installs the connector(s) with corresponding electrical connectors. At 432, the robotic installer determines whether more connectors need to be installed (e.g., according to a set of installation instructions). When true, the method 400 returns to 420. When false, however, the method 400 end or returns to 404.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A staging system for robotic installation of a conductor assembly that includes a set of wire cables connected to a respective set of connectors, the staging system comprising:
    a base member defining a base identifier that is identifiable by a robotic installer;
    a set of receptacles attached to the base member and defining respective receptacle identifiers that are identifiable by the robotic installer, wherein each receptacle is configured to receive and temporarily secure one or more of the set of connectors of the conductor assembly; and
    a set of robotic installation features at least temporally attached to or defined by the set of connectors, respectively, and defining respective installation identifiers that are identifiable by the robotic installer, wherein each robotic installation feature is configured to be temporarily interacted with by an end effector of the robotic installer such that the robotic installer obtains movable control of the connector to remove it from its respective receptacle and to install it with a corresponding electrical connector.

2. The staging system of claim 1, wherein the base identifier is a scannable identifier defined on a surface of the base member.

3. The staging system of claim 2, wherein the set of receptacle identifiers are predefined positions with respect to the base member that are known by the robotic installer without scanning.

4. The staging system of claim 2, wherein the set of receptacle identifiers are scannable identifiers defined on surfaces of the respective receptacles or on the surface of the base member proximate to the respective receptacles.

5. The staging system of claim 4, wherein the installation identifiers are scannable identifiers defined on surfaces of the respective connectors, surfaces of the set of wire cables corresponding to the respective connectors, or surfaces of the robotic installation features corresponding to the respective connectors.

6. The staging system of claim 5, wherein corresponding pairs of receptacle identifiers and installation identifiers collectively form a single complimentary scannable identifier.

7. The staging system of claim 1, further comprising one or more preliminary robotic installation features at least temporarily attached to or defined by the base member, wherein the one or more preliminary robotic installation features are configured to be interacted with by the end effector or another end effector of the robotic installer to position the base member, the set of receptacles, the conductor assembly, and the set of robotic installation features in an installation position for a vehicle.

8. The staging system of claim 7, wherein the base member is at least temporarily attached to an outer surface of a controller of the vehicle.

9. The staging system of claim 8, wherein the one or more preliminary robotic installation features are removable from the base member upon the controller, the base member, the set of receptacles, the conductor assembly, and the set of robotic installation features being positioned in the installation position for the vehicle.

10. The staging system of claim 9, wherein opposing ends of the set of wire cables of the conductor assembly are preconnected to the controller, and wherein the set of connectors of the conductor assembly are configured to be installed with corresponding electrical connectors associated with sensor systems of the vehicle.

11. A method of robotic installation of a conductor assembly including a set of wire cables and a respective set of connectors, the method comprising:
    identifying, by a robotic installer, a base identifier defined by a base member of a staging system, wherein the staging system further comprises a set of receptacles attached to the base member and wherein each receptacle is configured to receive and temporarily secure one or more of the set of connectors of the conductor assembly;
    identifying, by the robotic installer, a set of receptacle identifiers defined the set of receptacles in response to identifying the base identifier;
    identifying, by the robotic installer, a set of installation identifiers defined by a set of robotic installation features at least temporarily attached to or defined by the set of connectors, respectively, in response to identifying the set of receptacle identifiers; and
    temporarily interacting with, by an end effector of the robotic installer, at least one of the set of robotic installation features to obtain movable control of a respective connector to remove it from its respective receptacle in response to identifying the set of installation identifiers and to then install it with a corresponding electrical connector.

12. The method of claim 11, wherein the base identifier is a scannable identifier defined on a surface of the base member that is scanned by the robotic installer to identify the base identifier and the base member.

13. The method of claim 12, wherein the set of receptacle identifiers are predefined positions of the set of receptacles with respect to the base member that are known by the robotic installer without scanning.

14. The method of claim 12, wherein the set of receptacle identifiers are scannable identifiers defined on surfaces of the respective receptacles or on the surface of the base member proximate to the respective receptacles and are scanned by the robotic installer to identify the set of receptacle identifiers and the set of receptacles.

15. The method of claim 14, wherein the installation identifiers are scannable identifiers defined on surfaces of the respective connectors, surfaces of the set of wire cables corresponding to the respective connectors, or surfaces of the robotic installation features corresponding to the respective connectors, and are scanned by the robotic installer to identify the set of installation identifiers, the set of robotic installation features, and the set of connectors.

16. The method of claim 15, wherein corresponding pairs of receptacle identifiers and installation identifiers collectively form a single complimentary scannable identifier.

17. The method of claim 11, wherein the staging system further comprises one or more preliminary robotic installation features at least temporarily attached to or defined by the base member, and wherein the method further comprises:
- identifying, by the robotic installer, the one or more preliminary robotic installation features; and
- temporarily interacting with, by the end effector or another end effector of the robotic installer, the one or more preliminary robotic installation features in response to identifying the one or more preliminary robotic installation features to thereby position the staging system in an installation position for a vehicle.

18. The method of claim 17, wherein the base member of the staging system is at least temporarily attached to an outer surface of a controller of the vehicle.

19. The method of claim 18, wherein:
- the one or more preliminary robotic installation features are removable from the base member upon the controller and the staging system being positioned in the installation position for the vehicle; and
- opposing ends of the set of wire cables of the conductor assembly are preconnected to the controller, and wherein the set of connectors of the conductor assembly are configured to be installed with corresponding electrical connectors associated with sensor systems of the vehicle.

20. A staging system for robotic installation of a conductor assembly that includes a set of wire cables connected to a respective set of connectors, the staging system comprising:
- a base member means defining a base identifier means that is identifiable by a robotic installer means;
- a set of receptacle means attached to the base member means and defining respective receptacle identifier means that are identifiable by the robotic installer means, wherein each receptacle means is configured to receive and temporarily secure one or more of the set of connectors of the conductor assembly; and
- a set of robotic installation feature means at least temporarily attached to or defined by the set of connectors, respectively, and defining respective installation identifier means that are identifiable by the robotic installer means, wherein each robotic installation feature means is configured to be temporarily interacted with by an end effector means of the robotic installer means such that the robotic installer means obtains movable control of the connector to remove it from its respective receptacle means and to install it with a corresponding electrical connector.

* * * * *